(12) United States Patent (10) Patent No.: US 12,625,040 B2
Floor (45) Date of Patent: May 12, 2026

(54) GAS SAMPLING APPARATUS FOR EXTRACTION OF GASEOUS SAMPLES

(71) Applicant: FLO2R APS, Hadsund (DK)

(72) Inventor: Karsten Brink Floor, Hadsund (DK)

(73) Assignee: FLO2R APS, Hadsund (DK)

( * ) Notice: Subject to any disclaimer, the term of this patent is extended or adjusted under 35 U.S.C. 154(b) by 932 days.

(21) Appl. No.: 17/792,225

(22) PCT Filed: Dec. 18, 2020

(86) PCT No.: PCT/DK2020/050381
§ 371 (c)(1),
(2) Date: Jul. 12, 2022

(87) PCT Pub. No.: WO2021/143987
PCT Pub. Date: Jul. 22, 2021

(65) Prior Publication Data
US 2023/0085113 A1 Mar. 16, 2023

(30) Foreign Application Priority Data
Jan. 13, 2020 (DK) ........................... PA 2020 70025

(51) Int. Cl.
*G01N 1/22* (2006.01)
(52) U.S. Cl.
CPC ......... *G01N 1/2205* (2013.01); *G01N 1/2258* (2013.01); *G01N 2001/227* (2013.01)
(58) Field of Classification Search
CPC .............. G01N 1/2205; G01N 1/2258; G01N 2001/227; G01N 2001/2261;
(Continued)

(56) References Cited

U.S. PATENT DOCUMENTS 3,759,087 A * 9/1973 Iwao .................... G01N 1/2247
55/523
4,779,466 A * 10/1988 Ramsner .............. G01N 1/2258
73/863.33
(Continued)

FOREIGN PATENT DOCUMENTS

CN 103234780 A 8/2013
CN 104535379 A 4/2015
(Continued)

OTHER PUBLICATIONS

English Translation of EP 1767920 A1, 6 pages.*
(Continued)

*Primary Examiner* — Dung H Bui
(74) *Attorney, Agent, or Firm* — Crowell & Moring LLP

(57) ABSTRACT

A gas sampling apparatus including a housing having a housing wall and a housing opening. The gas sampling apparatus includes a sample system for extracting the gaseous sample, including a sample pipe having an opening enclosed by the housing wall and in fluid communication with the gaseous environment and filter means including a filter for filtering solid particles from the gaseous sample. The filter is enclosed by the housing wall and arranged at the opening. The gas sampling apparatus includes a central purge system to remove aggregates of solid particles deposited on one or more housing surfaces by a gaseous medium, wherein the central purge system includes a purge pipe including an outlet opening directed towards the housing opening and enclosed by the housing wall, wherein the sample system is arranged externally to the central purge system so that the sample pipe is separate from the purge pipe.

16 Claims, 2 Drawing Sheets

(58) Field of Classification Search

CPC ............. G01N 2001/2285; G01N 2001/2282;
G01N 2001/2288; B08B 5/02

See application file for complete search history.

(56) References Cited

U.S. PATENT DOCUMENTS

| | | | | |
|---|---|---|---|---|
| 5,039,322 | A * | 8/1991 | Holzl | B01D 46/448 |
| | | | | 73/863.24 |
| 5,400,665 | A * | 3/1995 | Zhu | H05H 1/42 |
| | | | | 73/864.81 |
| 5,423,228 | A * | 6/1995 | Budd | G01N 1/2258 |
| | | | | 73/863.81 |
| 5,777,241 | A * | 7/1998 | Evenson | G01N 1/2258 |
| | | | | 73/863.25 |
| 6,022,510 | A * | 2/2000 | Springmann | G01N 33/0011 |
| | | | | 73/863.25 |
| 6,148,678 | A | 11/2000 | Chapman | |
| 6,555,385 | B1 * | 4/2003 | Honda | G01N 1/405 |
| | | | | 436/124 |
| 7,337,683 | B2 * | 3/2008 | DeFriez | G01N 1/2258 |
| | | | | 73/863.25 |
| 9,459,199 | B2 | 10/2016 | Nicholson | |
| 11,402,303 | B2 * | 8/2022 | Mitchell | G01N 1/2205 |
| 2003/0213311 | A1 * | 11/2003 | Graze, Jr. | G01N 1/2252 |
| | | | | 73/864.21 |
| 2005/0241416 | A1 | 11/2005 | DeFriez et al. | |
| 2007/0180893 | A1 | 8/2007 | Floor | |
| 2009/0211370 | A1 | 8/2009 | Ferri et al. | |
| 2014/0076027 | A1 | 3/2014 | Nicholson | |
| 2020/0110056 | A1 * | 4/2020 | Chen | G01N 1/2273 |
| 2020/0232888 | A1 * | 7/2020 | Mitchell | G01N 1/38 |
| 2022/0018739 | A1 * | 1/2022 | Sabil | G01N 33/383 |
| 2023/0085113 | A1 * | 3/2023 | Floor | G01N 1/2258 |
| | | | | 422/83 |

FOREIGN PATENT DOCUMENTS

| | | | |
|---|---|---|---|
| CN | 104968438 | A | 10/2015 |
| CN | 105181394 | A | 12/2015 |
| CN | 108139303 | A | 6/2018 |
| DK | 1767920T | T3 | 6/2008 |
| EP | 0 292 598 | A1 | 11/1988 |
| EP | 0 324 330 | A1 | 7/1989 |
| EP | 1 767 920 | A1 | 3/2007 |
| GB | 1 340 918 | | 12/1973 |
| JP | 2017-090365 | A | 5/2017 |
| WO | WO 95/28628 | | 10/1995 |
| WO | WO 2005/103643 | A1 | 11/2005 |

OTHER PUBLICATIONS

English Translation of EP 0324331 A1, 6 pages.*

English Translation of EP 0324331, 6 pages (Year: 2025).*

English Translation of EP 1767920, 6 pages (Year: 2025).*

Chinese Office Action and Search Report with English translation, Dec. 14, 2024, pp. 1-24, issued in Chinese Application No. 20208009264.4, State Intellectual Property Office, Beijing, China.

Office Action (Eight pages English language) dated Jul. 3, 2020 from Danish Priority Application PA 2020 70025.

International Search Report dated Mar. 4, 2021 (Three pages English language) from PCT Priority Application PCT/DK2020/050381.

Written Opinion dated Mar. 4, 2021 (Nine pages English language) from PCT Priority Application PCT/DK2020/050381.

Office Action dated Jun. 6, 2024 (5 pages) out of corresponding European Application No. 20 828 520.5.

English translation of Chinese Office Action issued in Chinese Application No. 2020800926244 dated Jun. 20, 2025 (13 pages).

* cited by examiner

GAS SAMPLING APPARATUS FOR EXTRACTION OF GASEOUS SAMPLES

CROSS-REFERENCE TO RELATED PRIORITY APPLICATIONS

This application is a national application based on Patent Cooperation Treaty Patent Application No. PCT/DK2020/050381, filed on Dec. 18, 2020, the entire contents of which are incorporated herein by reference.

This application claims under 35 U.S.C. § 119 (a) the benefit of the filing date of Danish Patent Application No. PA202070025, filed on Jan. 13, 2020, the entire contents of which are incorporated herein by reference.

BACKGROUND OF THE INVENTION

Field of Invention

The invention relates to a gas sampling apparatus for extraction of a gaseous sample from a gaseous environment as well as to cleaning of the gas sampling apparatus.

Description of Related Art

In industries such as cement kilns there exist a need for monitoring the content of flue gasses produced so as to perform quality check and optimization of the combustion process and to check for occurrence of any harmful gasses produced by the process. It is especially beneficial to be able to continuously monitor the flue gas content over time in order to increase the understanding of the combustion process.

However, the flue gasses provide a gaseous environment of extreme temperatures and extreme dust loads, which in turn apply extreme demands to the equipment used, especially the equipment situated inside and exposed to the gaseous environment for sampling gaseous samples. Solid particles from the flue gas can adhere to the equipment and eventually cause deterioration of the sampling efficiency, which in turn increase the time spend on maintaining the equipment and potentially decreasing equipment-lifetime.

Therefore, it is an object of the present invention to provide a gas sampling apparatus, which allows for efficient monitoring of flue gas content in harsh conditions and for efficient removal of any disadvantageous solid particles adhering to the gas sampling apparatus.

SUMMARY OF THE INVENTION

The first aspect of the invention relates to a gas sampling apparatus for extraction of a gaseous sample from a gaseous environment including flue gas comprising solid particles, wherein the gas sampling apparatus includes a housing having a housing wall enclosing an interior of the housing, wherein the housing wall includes an exterior housing surface, an interior housing surface, a rim surface connecting the exterior housing surface and the interior housing surface and enclosing a housing opening directed towards the gaseous environment during use, wherein the housing opening is configured to provide fluid communication between the gaseous environment and the interior of the housing, a sample system for extracting the gaseous sample, wherein the sample system includes at least one sample pipe having a first opening, wherein at least the first opening is enclosed by the housing wall and is configured to be in fluid communication with the gaseous environment, and filter means including at least one filter for filtering a plurality of solid particles from the gaseous sample, wherein the filter is enclosed by the housing wall and arranged at the first opening of the sample pipe, wherein the gas sampling apparatus further includes a central purge system configured to remove aggregates of solid particles deposited on one or more housing surfaces via a gaseous medium, such as air, wherein the central purge system includes at least one first purge pipe including a first outlet opening directed towards the housing opening and enclosed by the housing wall, wherein the sample system is arranged externally to the central purge system so that at least the sample pipe(s) are separate to the first purge pipe(s).

Advantageously, the present invention provides a gas sampling apparatus, which is both capable of extraction a gaseous sample through a filter and through the sample pipe and in addition, the gas sampling apparatus is also capable of cleaning at least the tip of the gas sampling apparatus pointed towards the gaseous environment by means of at least the central purge system.

In one or more embodiments, the gaseous environment may be an interior environment of a duct, flue stack, or a chimney, wherein the gaseous environment contains gaseous media and solid particles, such as a product of combustion from an industrial plant, such as cement kilns, Lime kilns, mineral kilns (Al, Mg, a.o), fertilizer kilns, waste boilers, etc. When coming into contact with the housing, a formation of aggregates of solid material may form on the housing and partly or entirely block the passageway through the housing opening. This is in particular troublesome when aggregates are formed on the interior surface of the housing and/or the rim surface of the housing at the tip of the gas sampling apparatus.

By the present invention the housing of the gas sampling apparatus is effectively cleaned such that any build-up of solid particles stuck to the interior housing wall at positions preventing efficient gas extraction, e.g. blocking the housing opening, may be removed without the need for manual cleaning and physically removing the gas sampling apparatus from the gaseous environment. In one or more embodiments, the gas sampling apparatus may in particular be arranged to clean the rim surface and/or a part of the interior surface of the housing, such as the interior surface of the housing positioned directly adjacent to the rim.

In one or more embodiments, the present gas sampling apparatus is configured to be used in gas sample extraction from exhaust-processes at high temperatures up to 1800° C., such as up to 1600° C., or such as up to 1400° C. Extracting a gaseous sample from combustion of alternative fuels, such as waste, produce worse conditions for gas extraction for gas analysis than combustion from conventional fuel, which in turn calls for more efficient and powerful purge systems for cleaning the gas sampling apparatus.

In one or more embodiments, the present gas sampling apparatus is in particular configured to extract samples from particular extreme conditions such as conditions of temperatures between 900 degrees celsius-1400 degrees Celsius. Extreme conditions may further include at least one of the following properties: a high content of dust such as between 200-2000 g/m³, low oxygen level, aggressive corrosive gasses, fallen materials, such as debris, and/or extensive wear from the combustion process. Extreme conditions may be present in environments containing flue gas produced from combustion of alternative fuel. Less extreme condition include environments generally having a temperature below 600 degrees Celsius, dust levels below 25 g/m³, high level of oxygen content, low concentrations of aggressive corrosive gasses and/or limited fallen debris and no wear or abrasion, as the gas is relatively clean.

In one or more embodiments, the gas sampling apparatus can provide measurements of an emission inside a chimney e.g. after the flue gas has undergone flue gas treatement, such as flue gas cleaning or flue gas purification e.g. in cement waste boilers, power plants, etc.

By the present invention having the sample system arranged externally to the central purge system, the gaseous medium for cleaning the gas sampling apparatus and the gaseous sample extracted by the gas sampling apparatus are led through different and separate pipes of the gas sampling apparatus. This has the advantageous effect of allowing the functionality and dimensions of the different pipes to be optimized based on their individual purpose. The inner diameter of a sample pipe for extraction of a gaseous sample is typically of a limited size, since large diameter pipes extracts large volumes and produce slow response time through the apparatus. In turn a small diameter pipe provide reduced cleaning power by gas cleaning and can furthermore have a cooling-effect on the pipe, which is disadvantageous for a subsequent extraction of a gaseous sample. By having separate pipes for cleaning and for sampling, i.e. the first purge pipe is not used for gas sampling and the sample pipe is not used for gas cleaning, the functionality and dimensions of the different pipes can be optimized based on their individual purpose. Additionally, a large diameter first purge pipe may further enable inspection of the first purge pipe from the open end of the housing.

Furthermore, since the first outlet opening of the first purge pipe is not in connection or in fluid communication with the filter or filter means, a large volume of gaseous medium for cleaning can flow through the purge pipe towards the tip of the gas sampling apparatus without having to overcome the obstacle of the filter means, which can significantly reduce the pressure of the flow. A powerful blow of gaseous medium may therefore be provided to remove build-up aggregates at the tip of the gas sampling apparatus. The present invention thereby allows for quick, simple, and efficient cleaning of the gas sampling apparatus. In one or more embodiments, the first purge pipe may be arranged so that it does not form a part of the gas extraction pathway of the gas sampling apparatus. The first purge pipe may be arranged to be used for blow back cleaning only and not for gas extraction, e.g. the first purge pipe may be devoid of openings or pipe branch(es) to filter means and/or sample pipe(s).

By the present invention, the tip of the gas sampling apparatus can be rapidly and regularly cleaned with minimal use of manual labor, which in turn allows for more efficient and continuous monitoring of the content of the flue gas. The central purge system effectively facilitates a self-cleaning feature of the gas sampling apparatus, which has the power to clean the apparatus even in very harsh environments and with very sturdy or sticky aggregates.

A sampling apparatus for extraction of gaseous samples are typically also referred to as a measuring probe, or a probe for gas analysis. The present gas sampling apparatus is of the extractive type, which extracts a sample from the gas flow from the gas duct or chimney. The present gas sampling apparatus has an open end positioned towards the gaseous environment when in use, through which the gas sample is extracted. The gas sample apparatus may preferably be configured to feed the extracted sample to an analyzer. The gaseous sample may be conditioned and prepared by the apparatus prior to being fed to the analyzer, e.g., the sample may be filtered by one or more filters and/or heated while travelling through the sample pipe.

In one or more embodiments, the housing of the gas sample apparatus may be arranged with the housing opening provided at one end of the housing at the tip of the gas sampling apparatus, being the open end of the housing and the gas sampling apparatus. In one or more embodiments, the housing may be of a generally elongated shape, with the housing opening arranged at one end of the elongated shape. The elongated shape allows for the gas sampling apparatus to extend a large distance inside the gaseous environment. In one or more embodiments, the first outlet opening of the first purge pipe is arranged so as to direct gas towards at least the open end of the housing, wherein the open end of the housing includes the housing opening and at least a part of the interior surface of the housing arranged immediately adjacent to said housing opening.

In one or more embodiments, the first outlet opening of the first purge pipe is directed towards the housing opening in such a manner, that the outlet opening is exposed to the housing opening and thereby to the gaseous medium from the outside gaseous environment, which can flow into the interior of the housing at the open end. In one or more embodiments, the outlet opening may preferably be arranged at the open end of the housing.

In one or more embodiments, a longitudinal centerline is defined for the housing as extending through the center of the housing along the longitudinal extent of the housing. In one or more embodiments, the housing may be of any shape, but preferably of a tubular shape. Both the interior and exterior housing wall may be tubular shaped.

In one or more embodiments, the housing wall may be configured to enclose at least the parts of the gas sampling apparatus which extends inside the gaseous environment when in use, so that fluid communication between these parts and the gaseous environment present on the outside of the apparatus is only facilitated through the housing opening. Extending inside the gaseous environment means the parts of the gas sampling apparatus which is included on the gaseous environment side of the chimney, duct, oven, etc..

When in use the housing may be arranged with the longitudinal extent of the housing extending perpendicular to the longitudinal extent of the duct or chimney, such as substantially perpendicular to flow of gaseous media of the gaseous environment.

In one or more embodiments, at least at the open end of the apparatus, nearest to the housing opening, the position of the first outlet opening of the first purge pipe is substantially centered within the housing. Additionally, the position of the first opening of the sample pipe may be arranged between the first outlet opening and the housing wall, when viewed radially from the longitudinal centerline of the housing towards the housing wall. By having the first purge pipe centered in the housing it has the effect of providing a compact and simple setup of the apparatus in which the sample pipe(s) can be arranged around the larger purge pipe within the housing.

In one or more embodiments, the sample pipe(s) may be distributed, such as substantially evenly distributed, along the outer perimeter of the first purge pipe or along the inner perimeter of the housing.

In one or more embodiments, the first purge pipe may be arranged co-axially with the housing wall. Additionally, or alternatively, at least the majority of the longitudinal extent of the first purge pipe, such as the part of the first purge pipe extending inside the gaseous environment during use, may extent in parallel with the longitudinal extent of the housing.

In one or more embodiments, the filter(s) is arranged between the first opening of the sample pipe and the gaseous environment present in the interior of the housing when the gas sampling apparatus is in use. In one or more embodiments, the filter(s) may be arranged from the first opening towards the housing opening. In one or more embodiments, the housing provides a filter housing with interior space between an exterior surface of the filter and the interior surface of the housing. The filter housing may be open towards the gaseous environment through the housing opening, so that the filter is directly exposed to the gaseous environment through the interior space of the housing and the housing opening. In one or more embodiments, the filter means preferably is in the sample system.

In one or more embodiments, the first opening of the sample system may be radially arranged between said central purge system and said housing wall. In one or more embodiments, when viewed radially from the longitudinal centerline, the first opening may be arranged externally to the first purge pipe and also between the first purge pipe and the housing wall. In one or more embodiments, the sample pipe may be radially arranged between the central purge system and the housing wall.

In one or more embodiments, the gas sampling apparatus may include between 1 and 6 sample pipes, such as between 1 and 3 sample pipes.

In one or more embodiments, the sample system may include a plurality of sample pipes, and the sample pipes may be arranged within the housing so as to collectively substantially surround the first purge pipe. Several sample pipes allows for higher probability of efficient sampling of the gaseous environment. In one or more embodiments, the plurality of sample pipes may be evenly distributed about the longitudinal centreline of the first purge pipe. Thereby the gas apparatus can sample from a large area of the open end.

In one or more embodiments, the first purge pipe may be configured to transfer a gaseous medium, such as air, from a first gas supply system to at least a part of the interior of the housing arranged adjacent to the housing opening.

In one or more embodiments, the first gas system may include one or more gas sources in fluid communication with the first purge pipe so as to provide gaseous medium from the gas source to the gaseous environment. In one or more embodiments, the first purge pipe may be configured to direct the gaseous medium towards the interior housing surface and/or the rim surface.

In one or more embodiments, the first gas system may include a a control or control means for allowing or preventing fluid communication between the gaseous medium of the gas source and the first purge pipe. In one or more embodiments, the control means may be a valve, preferably a canon valve. The valve may be arranged to trigger a release of a large volume of air from the storage means, such as a gas tank, through the first purge pipe towards the open end of the housing. In one or more embodiments, the gas tank comprises a large exit hole for allowing sufficient fluid connection between the interior of the gas tank and the interior of the first purge pipe so as to provide a large blow of gaseous medium sufficient for cleaning build-up aggregates, or debris of aggregates, off the housing wall.

In one or more embodiments, the first gas system may include a blaster system, such as an air blaster, for storing and releasing a gaseous medium, wherein the blaster system includes a gas tank and/or a gas receiver and a triggering mechanism. In one or more embodiments, the gas tank is configured to store pressurized gas, such as compressed air. In one or more embodiments, the triggering mechanism includes a canon valve for controlling the release of gaseous medium from the gas tank to the first purge pipe. Advantageously, the canon valve allows for a large volume of gaseous medium to be released through the central purge system at a high velocity. In one or more embodiments, the first gas system may include a compressor for compressing gaseous medium and providing it to the gas tank.

In one or more embodiments, the gas sampling apparatus may include the first gas supply system for providing gaseous medium, such as air, to at least the first purge pipe.

In one or more embodiments, the gaseous medium may be of the following types, or a mix of the following types: air, nitrogen, air mixed with water, nitrogen mixed with water, air mixed with nitrogen, or air mixed with nitrogen and water. In one or more embodiments, compressed air is used as gaseous medium for the central purge system.

In one or more embodiments, the first outlet opening is of a size so that at least a part of the interior of the first purge pipe is accessible from the outside of the gas sampling apparatus through the housing opening, whereby the first purge pipe may be manually cleaned. This is in particular advantageous, in cases where the gas sampling apparatus is to be used in very harsh environments and where it may be considered to be necessary to periodically clean the first purge pipe by manual cleaning in order to maintain the function of the gas apparatus over a large period of time. By the present example, the first purge pipe may be cleaned without having to remove any of the filters for filtering the gaseous sample extracted.

In one or more embodiments, the first purge pipe may be cleaned with an elongated rigid object, which can be introduced from the back end of the housing, opposite the open end of the housing. The back end may be positioned outside the gaseous environment. In one or more embodiment, the gas sampling apparatus and the first purge pipe are arranged so that the rigid object is capable of reaching the entire interior surface of the first purge pipe. Additionally, the rigid object may be capable of reaching elements located between the first outlet opening of the first purge pipe and the tip of the housing, such as the rim of the housing opening.

In one or more embodiments, the first purge pipe is of a size allowing visual inspection of the interior of the pipe, preferably along the entire length of the first purge pipe extending along the longitudinal extent of the housing.

In one or more embodiments, the first outlet opening of the first purge pipe may have an inner outlet diameter, which is between 15-35 mm, such as between 20-30 mm.

In one or more embodiments, the first purge pipe may have an inner diameter, which is between 15-35 mm, preferably between 20-30 mm.

By using a relatively large inner diameter of the central purge pipe, loss of pressure within the pipe when displacing large volumes of gaseous medium is small compared to a pipe of a smaller inner diameter. The reason for this is that the air velocity in the smaller pipe will be larger than in the larger pipe in order to displace the same amount of air, due to the smaller cross sectional area of the smaller pipe. Advantageously, by preventing loss of pressure the gas sampling apparatus can function more efficiently and provide sufficient cleaning of the tip of the gas sampling apparatus.

In one or more embodiments, the first outlet opening of the first purge pipe may be arranged to provide fluid communication between the interior of the first purge pipe and the interior space of a nozzle section extending between the first purge pipe and the housing opening. The nozzle section may include a nozzle inlet having a nozzle inlet opening enclosed by an inlet rim, a nozzle outlet having a nozzle outlet opening enclosed by an outlet rim, a nozzle wall extending from the nozzle inlet rim to the nozzle outlet rim, and enclosing a nozzle interior space. The nozzle inlet opening and first outlet opening may be arranged to allow for fluid communication between the interior space of the nozzle section and the space located exterior to the nozzle section, e.g. the gaseous environment and/or the interior space of the first purge pipe.

In one or more embodiments, the nozzle section may be symmetrically shaped about a longitudinal center-axis of the nozzle section extending perpendicular to the nozzle inlet opening and the nozzle outlet opening, through the center of the nozzle inlet opening and the nozzle outlet opening. The longitudinal centerline of the nozzle section may be parallel to the longitudinal extent of the housing of the gas sampling apparatus.

In one or more embodiments, the nozzle inlet opening may preferably have an inner diameter being smaller than an inner diameter of the nozzle outlet opening. At least a part or the entire extent of the nozzle wall may be tapered from the inlet to the outlet of the nozzle, such that gaseous medium entering the inlet may be directed in a direction outwards towards the housing wall of the gas sampling apparatus. Advantageously, this allows for the gaseous media for purging the tip of the gas sampling apparatus to be spread and directed to areas of the housing wall to be cleaned, in particular to the interior housing surface near the tip of the gas sampling apparatus and towards the rim of the housing opening.

In one or more embodiments, the nozzle inlet opening may have an inner diameter, which is between 10-50 mm, such as between 20-40 mm.

In one or more embodiments, the inner nozzle diameter may be increasing from the nozzle inlet to the nozzle outlet. The nozzle outlet opening may have an inner diameter, which is smaller or equal to an inner diameter of the housing. In one or more embodiments, the nozzle opening have an inner and outer diameter which is smaller than the inner diameter of the housing. In one or more embodiments, the nozzle outlet opening may have an inner diameter, which is between 30-70 mm, such as between 35-60 mm.

In one or more embodiments, the sample pipe may have an inner diameter, which is between 5-13 mm, preferably between 6-12 mm.

Advantageously, the sample pipe of the present invention is of a size allowing for a more efficient extraction of a gas sample. Increasing the inner diameter of the sample pipe would in turn increase the amount of gaseous medium from the gaseous environment, which would need to be extracted in order to conduct a gas analysis of the sample. In one or more embodiments, there may be no need for the sample pipe to function as a cleaning means, i.e. there may be no need to execute blow back of gaseous medium for cleaning in a direction opposite the direction for extraction of a sample and therefore the shape, size etc. of the sample pipe may be optimized to the sole function of extracting gaseous samples.

In one or more embodiments, the first outlet opening of the first purge pipe may have an inner diameter, which is between 1.5-5 times larger, such as between 2-4 times larger, than an inner diameter of the first opening of the sample pipe.

In one or more embodiments, the gas sampling apparatus may further include a filter cleaning system for cleaning the at least one filter, wherein the filter cleaning system includes one of more filter cleaning pipes configured to direct a gaseous medium, such as air, through the filter towards the gaseous environment.

In one or more embodiments, the gaseous medium is directed through the filter so as to lift off any solid particles deposited on and within the filter during extraction of a gaseous sample by the sample pipe.

In one or more embodiments, the one or more filter cleaning pipes are arranged externally to the first purge pipe(s) and the sample pipe(s). By the present setup, gaseous media led through the first purge pipe will by-pass the filter and thereby be unobstructed by the presence of the filter in the gas sampling apparatus. The one or more filter cleaning pipes may preferably be located inside the housing, between the first purge pipe and the housing wall. In one or more embodiments, the filter cleaning pipes may be distributed, such as substantially evenly distributed, along the outer perimeter of the first purge pipe or along the inner perimeter of the housing.

In one or more embodiments, the filter cleaning system may be configured for connecting with a gas source, wherein the gas source is arranged to store a gaseous medium for cleaning said at least one filter of the gas sampling apparatus. In one or more embodiments, the gas source may include a storage tank for storing gaseous medium and a control or control means, such as a valve, for preventing and releasing gaseous medium through the filter cleaning pipes. In one or more embodiments, the filter cleaning system may include the gas source.

In one or more embodiments, the filter cleaning pipes may include comprise a filter cleaning inlet opening configured to be connected with a gas source and a filter cleaning outlet opening arranged so as to face the at least one filter.

In one or more embodiments, the gas sampling apparatus includes between one and three, preferably one sample pipe. In one or more embodiments, the gas sampling apparatus includes a plurality of filter cleaning pipes, preferably between one and five filter cleaning pipes, such as one or two filter cleaning pipes.

In one or more embodiments, the one or more filters of the filter means is in connection, such as in abutment, with the first opening of the sample pipe(s). Alternatively, or additionally, the one or more filters is in connection, such as in abutment, with the filter cleaning outlet opening of the filter cleaning system. In one or more embodiments, the one or more filter(s) are arranged between the nozzle and the first opening of the sample pipe, such as extending form the nozzle to the first opening of the sample pipe.

In one or more embodiments, the first opening of the sample pipe and the filter cleaning outlet opening may be arranged in the same plane.

In one or more embodiments, at least the filter cleaning outlet opening of the filter cleaning pipe may be arranged at an approximately 100-140 degree angle, such as a 120 degree angle from the first opening of the sample pipe.

In one or more embodiments, the sample pipe may be configured to be connected to a gas source so as to provide gaseous medium, such as air from the first opening of the sample pipe through the at least one filter of the filter means. The sample pipe may have a double function, allowing for both sample extraction and blow back cleaning of the filter by the same sample pipe.

In one or more embodiments, the filter(s) of the filter means may be arranged between the first opening of the at least one sample pipe and the gaseous environment present in the interior of the housing, when the gas sampling apparatus is in use.

In one or more embodiments, the filter(s) of the filter means is arranged in fluid connection with the first opening of the at least one sample pipe and in fluid connection with the gaseous environment present in the interior of the housing, when the gas sampling apparatus is in use.

In one or more embodiments, the filter(s) is arranged so as to catch solid particles from the gaseous sample forced through the filter towards the sample pipe, such that the gaseous sample displaced through the sample pipe is preferably free of solid particles. In one or more embodiments, the gasous sample is extracted through an exterior surface of the filter facing the interior housing wall and/or the the housing opening.

In one or more embodiments, the filter is of a type configured to be used in gaseous environment containing flue gas with solid particles and having a temperature up to 1800 degrees Celsius, such as up to 1600 degrees Celsius, such as up to 1400 degrees Celsius. The filters may be of a sintered steel or ceramic type.

In one or more embodiments, the filter, such as the entire longitudinal extent of the filter, is arranged radially between an exterior surface of the first purge pipe and the housing.

In one or more embodiments, the filter is of a tubular shape and is arranged coaxially with the first purge pipe. The one or more filters may be arranged so as to substantially enclose the first purge pipe, e.g. the filters may be arranged with a distance between them and distributed around the periphery of the exterior surface of the first purge pipe. Preferably, the one or more filters are arranged so as to surround an entire periphery of the exterior surface of the first purge pipe, e.g. the filter means may include a single tubular shaped filter with an inner diameter substantially corresponding to an outer diameter of the first purge pipe. In one or more embodiments, the first purge pipe extends all the way through the interior space of a tubular filter.

In one or more embodiments, the filter may preferably be arranged in the open end of the housing, wherein the open end of the housing is arranged to be positioned inside the gaseous environment, during use. Advantageously, this provides for filtered gas samples to travel through the sample pipe(s), which significantly reduces aggregation of solid particles and thereby the cleaning needs of the sample pipe(s). Additionally, having the sample pipe extending a large distance from the back end towards the open end, may allow for increase response time, due to the generally narrower cross-sectional size of the sample pipe compared to the cross section of the interior of the housing. The open end of the housing may preferably provide the most distal part of the apparatus, arranged furthest into the gaseous environment.

In one or more embodiments, the filter and the housing opening is positioned in an open end of the housing and wherein the open end of the housing is arranged to be positioned inside the gaseous environment, during use.

In one or more embodiments, the filter, such as the entire longitudinal extent of the filter, is arranged radially between an exterior surface of the first purge pipe and the housing and additionally the filter is positioned in the open end of the housing.

In one or more embodiments, the gas sampling apparatus may be arranged so that from the open end of the housing to the back end of the housing, a gas sample may be extracted through the apparatus along a pathway including the following sequence of the elements; the housing opening, the interior of the housing, the filter(s) and the sample pipe(s). The pathway may preferably bypass the first purge pipe, optionally also the nozzle section, so that neither are used for gas sample extraction. In turn neither the filter(s) nor the sample pipe(s) may be used as a pathway for blow back purge gaseous media travelling through the first purge pipe towards the housing opening for cleaning of the housing surface(s). I.e. the gaseous media from the first purge pipe may completely bypass the filter(s) and sample pipe(s) towards the housing opening. Advantageously, this may prevent pressure loss to be introduced in the gaseous media led through the first purge pipe, as the gaseous media is unobstructed along its pathway. Furthermore it may prevent damages to be introduced to the filter and/or sample pipe, caused by the potentially large pressure of the gaseous media.

In one or more embodiments, the open end of the housing may be defined from the tip of the apparatus, e.g., a cross-sectional position comprising the housing opening, to a cross sectional position, where the interior surface of the housing is no longer exposed to the gaseous environment, e.g., typically at a cross section including the second outlet opening of the second purge pipe and/or the first opening of the sample pipe.

In one or more embodiments, the first opening of each sample pipe may be arranged at a back end of the filter, the back end of the filter directed towards the back end of the apparatus, and may extend substantially along a straight line from the filter towards the back end of the apparatus.

In one or more embodiments, the filter is arranged so as to be accessible through the open end of the housing, e.g. through the housing opening placed in the open end of the housing, which is advantageous in need of replacing or fixing the filter or the like. In one or more embodiments, the apparatus includes a nozzle section, removable through the housing opening, and the filter may be arranged to be readily accessible by first removing at least a part of the nozzle section.

In one or more embodiments, the gas sampling apparatus further includes a peripheral purge system configured to clean at least a part of an exterior surface of the filter, wherein the peripheral purge system comprises one or more second purge pipes enclosed by the housing wall and arranged externally to the sample system.

In one or more embodiments, the exterior surface of the filter may be arranged so as to face the interior surface of the housing. A filter house space may be provided between the interior surface of the housing and the exterior surface of the filter. The peripheral purge system may be arranged to provide a blow of gaseous medium, i.e. cleaning gas through the filter house space provided between the interior surface of the housing and the exterior surface of the filter, wherein the blow of gaseous medium is large enough to collect any solid particles e.g. dust located on the exterior filter surface and transport it out through the housing opening. Due to the central purge system and its ability to remove any aggregated solid particles blocking at least part of the housing opening, the cleaning gas from the peripheral purge system containing the collected solid particles may readily exit through the housing opening. In one or more embodiments, a space may be provided between the nozzle and the interior surface of the housing, so as to allow for purge gas from the peripheral purge system to travel within this space and exit through the housing opening.

In one or more embodiments, the gaseous medium from the peripheral purge system does not travel through the filter but instead along the filter surface. In one or more embodiments, the peripheral purge system may also be arranged so as to assist in the transportation of any dust lifted off the filter(s) by the filter cleaner or cleaning means.

In one or more embodiments, the one or more second purge pipes are configured to be connected to a second gas supply system and to transfer a gaseous medium, such as air, from the second gas supply system to at least a part of the exterior surface of the filter.

In one or more embodiments, the second gas system may include one or more gas sources in fluid communication with the second purge pipe so as to provide gaseous medium from the gas source to the gaseous environment. The second gas system may include a control or control means for allowing or preventing fluid communication between the gaseous medium of the gas source and the second purge pipe. In one or more embodiments, the control means may be a valve, preferably a canon valve. The valve may be arranged to trigger a release of a large volume of air from the storage means, such as a gas tank, through the second purge pipe towards the open end of the housing. In one or more embodiments, the gas tank includes a large exit hole for allowing sufficient fluid connection between the interior of the gas tank and the interior of the second purge pipe so as to provide a large blow of gaseous medium sufficient for cleaning debris off the housing wall, e.g. very sturdy and sticky aggregates.

In one or more embodiments, the second gas system may include a blaster system, such as an air blaster, for storing and releasing a gaseous medium, wherein the blaster system includes a gas tank or an gas receiver and a triggering mechanism. In one or more embodiments, the gas tank is configured to store pressurized gas, such as compressed air. In one or more embodiments, the triggering mechanism includes a canon valve for controlling the release of gaseous medium from the gas tank to the second purge pipe. Advantageously, the canon valve allows for a large volume of gaseous medium to be released through the peripheral purge system at a high velocity. In one or more embodiments, the second gas system may include a compressor for compressing gaseous medium and providing it to the gas tank.

In one or more embodiments, the gas sampling apparatus may include the second gas supply system for providing gaseous medium, such as air, to at least the second purge pipe.

In one or more embodiments, the gaseous medium may be of the following types, or a mix of the following types: air, nitrogen, air mixed with water, nitrogen mixed with water, air mixed with nitrogen, or air mixed with nitrogen and water. In one or more embodiments, compressed air is used as gaseous medium for the peripheral purge system.

In one or more embodiments, the gaseous medium to be directed through the first purge pipe(s) and/or the second purge pipe(s) is compressed to a degree sufficient for removing debris at the open end of the housing, which may hinder proper gas sample extraction for gas analysis. In one or more embodiments, the gas tank of the first and/or second gas supply system may have a capacity of between 10-50 liters.

In one or more embodiments, gas tank of the first and/or second gas supply system may store gaseous medium, such as air, at a pressure of between 3-20 bars.

In one or more embodiments, the gas sampling apparatus provides cleaning by gaseous media blowing in a direction from the back end towards the open end of the housing by separate cleaning of housing tip, e.g. interior surface near the rim of the housing and/or rim of housing, filter exterior surface, and inside and outside of filter. No plunger may be needed to remove material build-ups around the filter or on the housing.

In one or more embodiments, the peripheral purge system includes distribution means including one or more second outlet openings, wherein the distribution means is arranged for distributing, such as evenly distributing, a gaseous medium from the second gas supply system through the second outlet opening(s) towards the housing opening. The distributing means may be arranged to distribute gaseous medium from the second gas supply system and the second purge pipe to one or more second outlet openings towards the housing opening. In one or more embodiments, the distributing means may include one or more inlet openings configured to be in connected with the one or more second purge pipes. The number of inlet openings may be equal to the number of second purge pipes. In one or more embodiments, the distribution means may include one inlet opening. In one or more embodiments, the distribution means includes a plurality of second outlet openings, such as two second outlet openings or such as three second outlet openings, such as between three and eight second outlet openings, or such as between three and six outlet openings.

In one or more embodiments, the second outlet opening(s) are directed towards the housing opening in such a manner, that interior space of the housing is extending between the second outlet opening(s) and the housing opening. In one or more embodiments, a pathway along straight line extending from the second outlet openings along the longitudinal extent of the housing to the housing opening is unobstructed so that the each second outlet opening is exposed to the housing opening. In one or more embodiments, the second outlet opening(s) are arranged at the open end of the housing.

Preferably, the distributing means may be arranged to handle a large volume of compressed gaseous medium and efficiently distribute the gaseous medium to the second outlet openings.

In one or more embodiments, the second outlet openings may be distributed, such as substantially evenly distributed, along the outer perimeter of the first purge pipe or along the inner perimeter of the housing. In one or more embodiments, the gas sampling apparatus may include a single outlet opening extending around the outer perimeter of the first purge pipe.

In one or more embodiments, the distribution means includes housing having a wall and interior space enclosed by the wall, wherein the interior space of the wall is arranged to allow and direct fluid communication from the inlet openings to the second outlet openings. The interior space may be extend between the inlet openings, the outlet openings, and an interior surface of the wall. In one or more embodiments, the distribution means may be a housing, preferably made of metal, including inlet(s), outlet(s) and an interior space enclosed by one or more wall(s) of the housing.

In one or more embodiments, the first purge pipe extends throughout the distribution means, such that the distribution means arranged distributed around the exterior surface of the first purge pipe. The interior space of the distribution means may be arranged between the inlet(s), outlet(s), and wall(s) of the housing. In one or more embodiments, the interior space may also be defined by a part of the exterior surface of the first purge pipe. In one or more embodiments, the interior space of the distribution means is completely separated from the interior of the first purge pipe. In one or more embodiments, the distribution means may include one or more pipe sections, each extending between a second outlet opening and the interior space of the distribution means, providing an enclosed pathway for fluid communication between the interior space of the distribution means and the second outlet opening.

In one or more embodiments, each first purge pipe enclosed by the housing is preferably extending substantially along a straight line extending from the first outlet opening towards the back end of the housing. In one or more embodiments, each sample pipe enclosed by the housing is preferably extending substantially along a straight line extending from the first opening towards the back end of the housing. In one or more embodiments, each second purge pipe enclosed by the housing is preferably extending substantially along a straight line extending from the distribution means towards the back end of the housing. In one or more embodiments, each filter cleaning pipe enclosed by the housing is preferably extending substantially along a straight line extending from the filter cleaning outlet opening towards the back end of the housing. Additionally, the straight lines along which the second purge pipe and/or the sample pipe and/or the filter cleaning pipe is extending may be parallel to the straight line along which the first purge pipe is extending within the housing.

In one or more embodiments, the sample pipe and/or the first purge pipe and/or the second purge pipe and/or the filter cleaning pipe is defined as extending substantially in a direction parallel to the longitudinal extent of the housing. At the rear end of the pipes towards the back end of the housing, each pipe may be in connection with one or more further pipes extending through the housing wall to the outside of the housing.

In one or more embodiments, the outlet opening of the first and/or second purge pipes is extending in the a plane parallel to a plane including the housing opening and/or the first opening.

In one or more embodiments, the central purge system and/or the filter cleaning system and/or the peripheral purge system are arranged to be operated independently from the sample system. Additionally, the central purge system and/or the filter cleaning system and/or the peripheral purge system are arranged to be operated independently from each other. E.g., in one or more embodiments, the filter cleaning system may be configured to function independently from the central purge system. In one or more embodiments, the filter cleaning system may be configured to function independently from the sample system. Each system may include means for providing gaseous medium at a volume and speed sufficient for removing debris at the open end of the housing, e.g. on the interior of the housing wall.

Advantageously, the independency allows for a more controllable cleaning process in which cleaning can be done selectively based on the cleaning needs present for the gas sampling apparatus. It furthermore allows for different velocities and volumes of gaseous medium to be used at the different areas to be cleaned.

In one or more embodiments, the sample system is in connection with one or more extraction means, for extraction of a gas sample through the sample pipe. The extraction means may be arranged to be capable of extracting a gaseous sample from an environment predominantly comprising exhaust gas at a temperature up to 1800 degrees Celsius, such as up to 1600 degrees Celsius, such as up to 1400 degrees Celsius. In one or more embodiments, the extraction means is a pump, such as an electrical or air driven pump, wherein the pump is configured to extract a gaseous sample from the gaseous environment through the sample pipe.

In one or more embodiments, the sample system is configured to be in connection with a gas analysis system so as to transfer the gaseous sample extracted from the gaseous environment to the gas analysis system. The gas analysis system may be arranged on the outside of the housing wall and being in fluid connection to the sample pipe within the housing by one or more intermediate pipes.

In one or more embodiments, the gas sampling apparatus includes a gas analysis system arranged in connection with said sample system and arranged to analyze gas sample extracted from the gaseous environment. The gas analysis system of one or more embodiments, may be arranged to analysis the content of the gas sample, preferably also concentrations of different molecules. The result of the gas analysis may be used for monitoring and adjusting the combustion process.

In one or more embodiments, the sample system includes a heater or heating means for heating at least an interior surface of the sample pipe. In one or more embodiments, the sample pipes include a second opening arranged as an outlet opening at an end of the sample pipe opposite the first opening. One or more heating elements may be arranged along the entire longitudinal extent of the sample pipe, such as from the first opening to the second opening.

In one or more embodiments, the housing includes a cooler mechanism or comprises cooling means, such as a cooling jacket, for cooling a least the exterior housing surface. The cooling means may preferably be imbedded in the housing wall of the housing, such as arranged between the interior and exterior surface of the housing wall. In one or more embodiments, the cooling means may include a cooling jacket for distributively cooling the periphery of the exterior housing surface of the housing wall. In one or more embodiments, the cooling means are arranged to be capable to cool the housing wall to a degree significantly limiting any damages to the housing wall, when the housing wall is exposed to exhaust gas at a temperature up to 1800 degrees Celsius, such as up to 1600 degrees Celsius, such as up to 1400 degrees Celsius.

In one or more embodiments, the gas sample apparatus may be arranged in connection with displacement means configured to move the gas sampling apparatus in and out of the gaseous environment. This advantageously allows for the gas sampling apparatus to be removed for safety reasons, such as power outrage or a fault occurring within the apparatus. The displacement means may be operated by an electric or pneumatic drive or drive means. In one or more embodiments, the gas sampling apparatus may be fixed to a cart, which is movable by the drive means.

The second aspect of the invention relates to a use of a gas sampling apparatus according to the first aspect of the invention for extracting a gas sample from a gaseous environment, such as from inside a gaseous environment, wherein a gaseous sample is extracted from said gaseous environment through the housing opening and the first opening and thereafter through the sample pipe, and wherein at least a part of the housing is cleaned by releasing a gaseous medium towards the housing surface(s) through at least the first purge pipe.

In one or more embodiments, the second aspect of the invention may-include any of the features and the benefits as described in relation to the first aspect of the invention.

DRAWING BRIEF DESCRIPTION OF THE DRAWINGS

Aspects of the present disclosure will be described in the following with reference to the figures in which:

FIG. 1a shows a cross sectional view of the gas sampling apparatus according to embodiments of the invention.

FIG. 1b shows an enlarged view of a part of the gas sampling apparatus encircled in FIG. 1a.

DETAILED DESCRIPTION

Figures 1A, 1B:
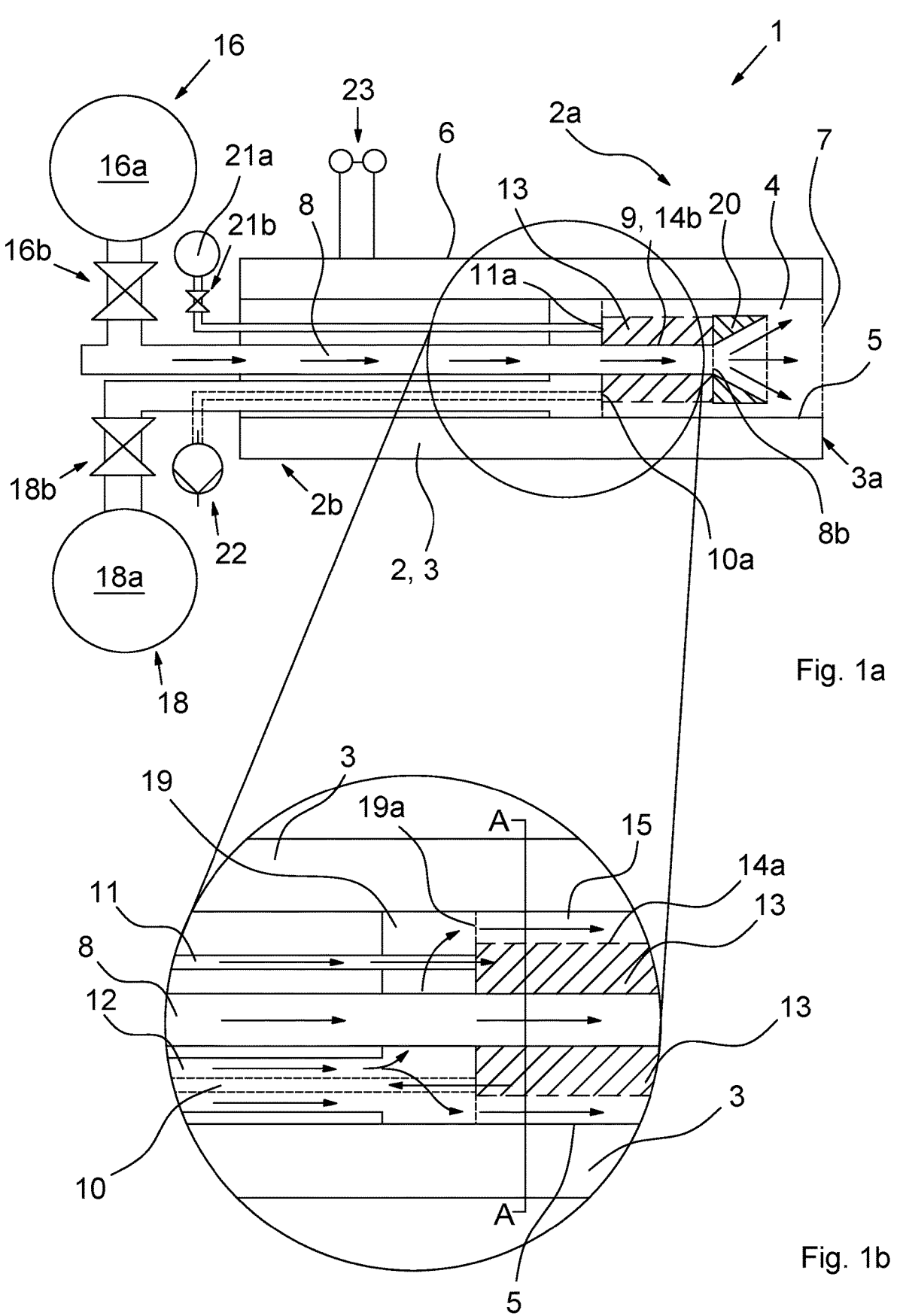

FIG. 1a illustrates a gas sampling apparatus 1 according to embodiments of the invention, seen in a longitudinal cross-sectional view at a vertical plane including the longitudinal centerline of the first purge pipe. A part of the gas sampling apparatus 1 shown in FIG. 1a is encircled by a dashed line and FIG. 1b shows the encircled part in an enlarged view. The gas sampling apparatus 1 may be placed inside a gaseous environment from which a gas sample is to be extracted by the gas sampling apparatus 1 in such a way that at least the tip of the gas sampling apparatus 1, including the open end of the housing 2a is placed inside the gaseous environment.

The gas sampling apparatus 1 of the present examples includes a housing 2 for protecting the elements enclosed by the housing 2 from the gaseous environment. The housing 2 is shown including a housing wall 3, which has an interior surface 5 facing the interior of the housing 4 enclosed by the housing wall 3 and an exterior surface 6 facing the gaseous environment. The interior 5 and the exterior surfaces 6 of the housing 2 are connected by a rim of the housing 3a at the tip of the housing 2. The rim of the housing 3a encloses a housing opening 7 placed at the end of the housing 2 extending furthest inside the gaseous environment, referred to as the open end 2a. Opposite the open end 2a is the back end of the housing 2b.

The gas sampling apparatus 1 shown in FIGS. 1a-1b further includes a central purge system having a first purge pipe 8, which from the open end of the housing 2a is arranged at the innermost part of the interior of the housing 4, such as substantially centrally arranged within the housing 2. At the open end of the housing 2a, the first purge pipe 8 is seen having a first outlet opening 8b facing the housing opening 7. By a nozzle 20 arranged adjacent to the first outlet opening 8b, gaseous medium from the first gas supply system may be directed towards the entire area of the housing opening 7 and/or parts of the interior surface of the housing wall 5. The first gas supply system of the present example is shown including a blaster system 16 having a gas tank 16a and a canon valve 16b for supplying gas through the first purge pipe 8 as indicated by the arrows in FIGS. 1a and 1b.

The gas sampling apparatus 1 shown in FIGS. 1a-1b further includes a peripheral purge system having a second purge pipe 12 in fluid connection with distributing means 19. The distributing means 19 are arranged to distribute the gaseous medium collected from the second purge pipe 12 through one or more second outlet openings 19a of the distributing means 19 arranged substantially along the periphery of the interior surface of the housing 5. The first purge pipe 8 has an exterior surface 9 directed towards the interior surface of the housing 5, and a space may be provided between the exterior surface of the first purge pipe 9 and the interior surface of the housing 5, which may be tubular as shown in the present examples. In the present examples, the space is also used as a filter housing 15 and the second outlet openings 19a of the peripheral purge system are located so as to introduce gaseous medium into the filter housing 15.

Towards the back end of the housing 2b, the second purge pipes 12 are connected to distributing means 19 which in turn is connected to a supply pipe connected to a second gas supply system, including a blaster system 18 with a canon valve 18b and a gas tank 18a. The distributing means distributes the air supplied from the gas tank 18a to the second purge pipes 12 as indicated by the arrows in FIGS. 1a-1b.

Along the pipeline from the gas tanks 16a, 18a and the first purge pipe 8 and the second purge pipe 12, a large inner diameter of the exit hole of the gas tanks 16a, 18a and any pipe sections and connections means interconnecting the gas tanks 16a, 18a to the first and second purge pipes 8, 12 are ensured so that a large volume of compressed gas may be released towards the open end of the housing 7 from the gas supply systems.

The gas sampling apparatus 1 is shown in FIGS. 1a-1b with a sample pipe 10 arranged inside the housing 2 and extending along the exterior surface of the first purge pipe 9 towards the open end of the housing 2a to a position located prior to the location of the first outlet opening 8b of the first purge pipe 8, i.e. further away from the housing opening 7 than the first outlet opening 8b. The sample pipe is arranged in connection with extraction means 22, such as a pump, for extracting a gaseous sample, such as for continuous extraction of a gas sample. The sample pipe 10 is arranged separately to the first and second purge pipes as shown in FIG. 1a, and is not physically connected with any of those pipes 8, 12 or distribution means 19, but instead functions independently from the central and peripheral purge systems of the apparatus 1. As indicated by arrows in FIG. 1b, the gas sample is directed in a direction from the open end of the housing 2a towards the back end of the housing 2b. The sample pipe 10 of the present example may be heated by a heater or heating means to a temperature which prevents condensation of water and acid from gaseous sample.

The gas sample apparatus 1 of the present examples collects gas, such as exhaust gas, through a filter 13, which is placed in the open end of the housing 2a arranged in the gaseous environment, such that the filter 13 is facing the gaseous environment. The gas sampling apparatus 1 may include a filter 13 of a tubular shape enclosing the first purge pipe 8 at an end of the pipe 8 and arranged in front of the first opening 10a of the sample pipe 10. The tubular filter 13 includes an exterior surface 14a directed towards the interior surface of the housing wall 5 and an interior surface 14b directed towards the exterior surface of the first purge pipe 9, e.g., in abutment with first purge pipe 8. In one or more examples, the second outlet openings 19a are arranged to clean the exterior surface of the filter 14a exposed in the filter housing 15.

Furthermore, in one or more examples, the gas sampling apparatus 1 may include a filter cleaning system having one or more, such as three, filter cleaning pipes 11 arranged to provide gaseous medium to clean the filter 13 by directing the gaseous medium devoid of solid particles through the filter 13 towards the open end of the housing 2a. The filter cleaning system is shown in FIGS. 1a-1b as including a gas source 21a for providing the gaseous medium and a valve 21b for controlling the flow of gaseous medium. In the present examples, the filter cleaning pipe 11 includes and outlet opening 11a arranged so as to face an end of the tubular filter 13 of the gas sampling apparatus 1, such that the filter 13 may be cleaning by blowing gaseous medium in a direction along the longitudinal extent of the filter 13. This will cause dust to be forced to the exterior surface of the filter 14a, where it can be further transported out through the housing opening 7 by at least the peripheral purge system.

In one or more examples of the present invention, the gas sampling apparatus 1 is arranged so that the flow direction of gaseous medium in the sample pipe 10 is opposite to the flow direction of the gaseous medium in the first purge pipe(s) 8, the second purge pipe(s) 12 and the filter cleaning pipe(s) 11. An example of such flow directions are indicated in FIG. 1b.

The first purge pipe 8 and the second purge pipe 12 are shown as being a straight pipes extending out through the back end of the housing 2b, and connected by connections means, e.g. a further pipe section, to a first gas supply system and second gas supply system, respectively. Similarly, the sample pipe 10 and the filter cleaning pipe 11 is also straight pipes extending through the back end of the housing 2b and connected to further pipe sections and the extractions means 22 and the gas source 21 respectively. Alternatively, all or some of the pipes 8, 10, 11, 12 may extend a shorter distance through the housing 2 and instead be connected to further pipe sections arranged through the housing wall 3. In one or more examples, the first purge pipe 8 and/or the second purge pipe 12 and/or the sample pipe 10 and/or the filter cleaning pipe 11 may be arranged in parallel inside the housing 2.

Figure 2:
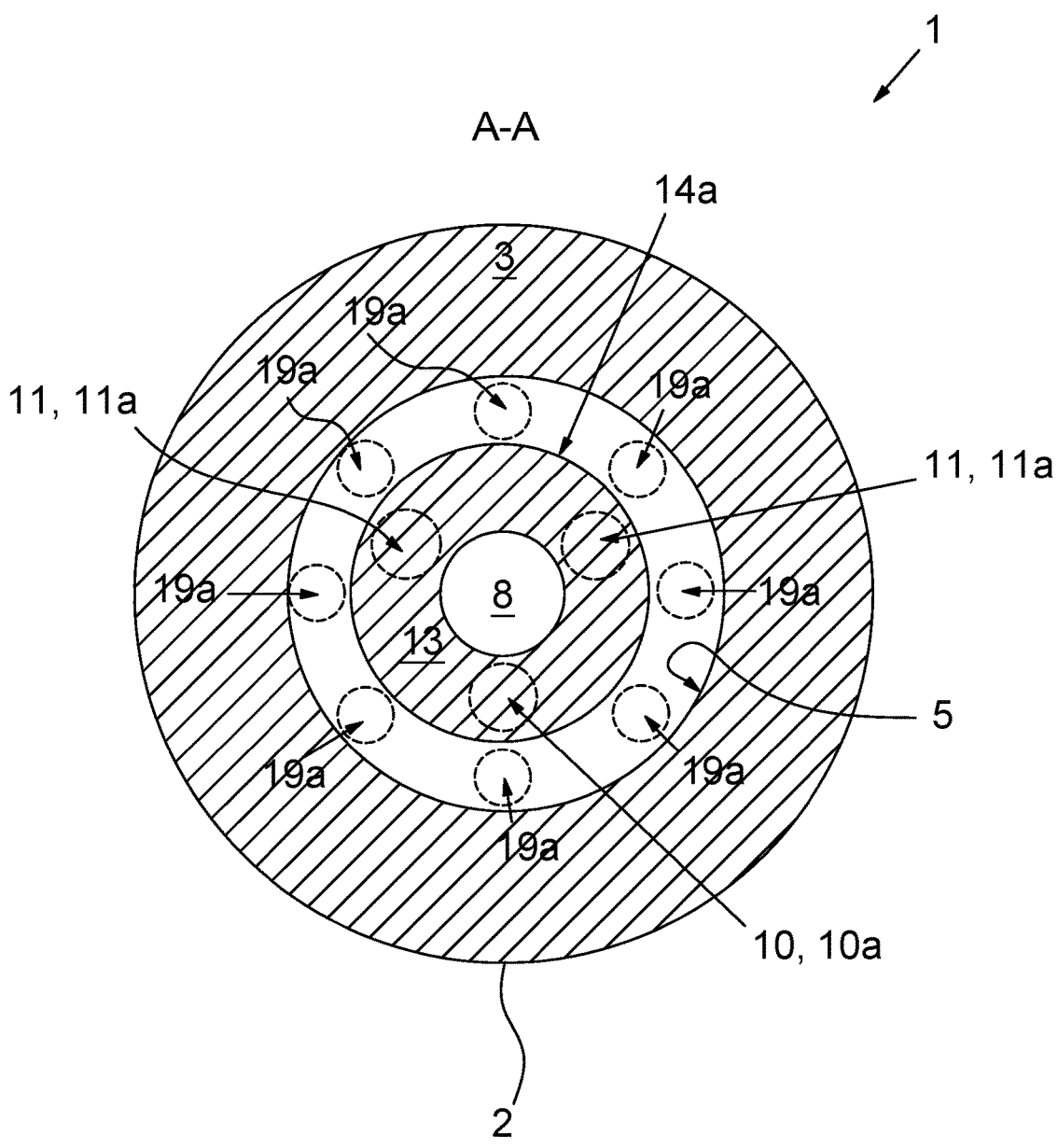
FIG. 2 shows a cross-sectional view of the gas sampling apparatus along the plane A-A as indicated in FIG. 1b.

FIG. 2 shows a schematic cross-sectional view of the gas sampling apparatus 1 in a plane extending through the filter of the gas sampling apparatus 1, wherein the plane is perpendicular to the longitudinal extent of the first purge pipe 8. In the present example, the gas sampling apparatus includes several layers of pipes for different purposes. The layers are as arranged from the center of the gas sampling apparatus to the perimeter of the gas sampling apparatus 1. The first purge pipe 8 of the central purge system is located in the center-most position and provides the center about which the further layers are arranged.

In one or more examples, the filter cleaning pipe(s) 11 and the sample pipe(s) 10 are located in a layer immediately adjacent to the first purge pipe 8. They may be arranged with a distance corresponding to the arc provided by a 120 angle between neighboring filter cleaning pipe(s) 11 and/or sample pipe(s) 10. In the present example, the gas sampling apparatus 1 includes two filter cleaning pipes 11 and one sample pipe 10. Each sample pipe 10 includes a first opening of the sample pipe 10a and each filter cleaning pipe 11 includes a filter cleaning outlet opening 11a directed towards the open end of the housing 2 including the housing opening. The filter 13 is arranged as a part of the same layer as the sample pipe 10 and the filter cleaning pipes 11. As can be seen in FIG. 2 as viewed from the open end of the housing 2, the filter cleaning outlet opening 11a and the first opening of the sample pipe 10a are covered by the filter 13 and terminate at a distance further from the housing opening than the first outlet opening of the first purge pipe 8b.

In one or more examples, and as seen in FIG. 2, the outermost layer is the housing 2 of the gas sampling apparatus 1. Cooling means may preferably be embedded in the housing wall 3 so as to reduce of the temperature of the outermost layer, i.e. housing 2, of the gas sampling apparatus 1 (not shown). As can be seen in the present example, the housing 2 may be of a tubular shape, at least near the opening end of the housing.

In one or more examples, and as seen in FIG. 2, the second outlet opening(s) of the second purge system is located between the housing 2 and the layer including the filter 13. The second outlet openings are located at a position along the longitudinal centerline of the gas sampling apparatus 1 being prior to the location of the filter 13, such that the filter 13 is exposed to the gas media exiting the second outlet opening(s) 19a, whereby the exterior surface of the filter 14a may be cleaned. The cleaning process may preferably be aided by the filter cleaning system which pushes solid particles, such as dust towards the exterior surface of the filter 14a. In the example shown in FIG. 2, the second purge system includes eight outlet openings, which may be visible from the open end of the housing 2 through the housing opening and the space provided between the interior housing surface 5 and the exterior surface of the filter 14a.

The gas sampling apparatus 1 of the present examples shown in FIGS. 1-2 is arranged to execute a powerful 3-step cleaning process by enabling the central purge system, the filter cleaning system and the peripheral purge system of the gas sampling apparatus 1. The gas sampling apparatus 1 of the present examples does not contain any mechanical cleaning means of the type, which is arranged to physically push or scrape aggregated particles of a surface, such as a plunger. The present example of a gas sampling apparatus 1 according to the invention provides a filter 13 placed in an open end of the housing 2a inside the process. The central first purge pipe 8 may preferably be used for blowing cleaning gas towards the housing opening 7 from the inside of the housing 2. Since the filter 13 is in the open end 2a near the tip of the housing 2, the gas sample led into the sample pipe 10 is free from solid particles, such as dust. In the gas sampling apparatus 1 of the present examples, compressed air is preferably used for cleaning the filter 13, the surface of the filter 14a and the interior housing surface 5.

In one or more examples, the gas sampling apparatus 1 is configured to be capable of extracting a gaseous sample from an environment of temperatures up to 1800 degrees Celsius, such as up to 1600 degrees Celsius, such as up to 1400 degrees Celsius. The gaseous environment containing the process gas to be analysed is typically at a pressure of between +50 mbar and −300 mbar compared to the pressure outside the gaseous environment, e.g. the outside of a chimney containing a process gas.

In one or more examples, gas sampling apparatus 1 is configured to extract a sample from an exhaust gas typically contain a concentration of $O_2$ which is approximately 0-5 Vol %, a concentration of CO between 0-30,000 ppm, a concentration of NO between 0-4,000 ppm, a concentration of $SO_2$ between 0-20,000 ppm, a concentration of $CO_2$ between 0-30 Vol %, and a concentration of $H_2O$ between 0-40 Vol %.

In one or more examples, the gas sample apparatus 1 is in particular configured to extract a gaseous sample for extractive analysis of dust-containing gasses. In one or more examples, the concentration of dust may be between 0-2,000 g/m$^3$.

The gas sample apparatus 1 may be mounted on an electric or pneumatic operated displacement means 23 as shown in FIG. 1a. In one or more examples, the gas sampling apparatus 1 may be arranged to be moved in and out of the process to remove deposits on the exterior housing surface of the housing wall 6.

In one or more examples, the gas sampling apparatus 1 is of a longitudinal extent which is of a size, so that gaseous samples extracted by the apparatus 1 is a "true" sample of the exhaust gas and preferably not affected by any gaseous media, which may exist at any mounting flanges within the environment or from layers of gaseous media produced near the interior walls enclosing the process gas to be analysed. The housing 2 of the gas sampling apparatus may be approximately 3 meters long, so as to be able to extract a sample from suitable positions within the gaseous environment.

In one or more examples, the housing wall 3 may preferably include one or more cooling means for water-cooling of the housing wall 3, which in turn provides mechanical strength of the housing and protects the housing from corrosion occurring at high temperatures. Especially in gaseous environments containing process gas e.g. from combustion within an industrial plant, the hot dust-containing and aggressive gas will condensate and aggregate when it is cooled by the lower temperature of the housing wall 3. The aggregation may comprise a mixture of dust, calcined raw meal, and sulfur or alkali. By the present invention and according to one or more examples, the gas sampling apparatus 1 can remove such aggregation adhering to the housing wall 3, in particular to the interior surface 5 and the rim of the housing wall 3*a*. In one or more examples, the sole purpose of the first purge pipe 8 is to provide a large burst of gas to blow off such aggregates.

In many gaseous environment containing solid particles, aggregation of solid particles may occur in the gaseous environment, which potentially can fall and land on the exterior surface of the gas sampling apparatus. The housing 2 of the gas sampling apparatus 1 may therefore preferably be configured to withstand such impacts, in particular, the housing 2 is shaped so as to provide a high degree of mechanical strength of the housing 2.

REFERENCE LIST

1 Gas sampling apparatus
2 Housing
2*a* Open end of the housing
2*b* Back end of the housing
3 Housing wall
3*a* Rim surface of housing at the open end
4 Interior of the housing
5 Interior housing surface
6 Exterior housing surface
7 Housing opening
8 First purge pipe
8*b* First outlet opening of the first purge pipe
9 Exterior surface of the first purge pipe
10 Sample pipe
10*a* First opening of the sample pipe
11 Filter cleaning pipe
11*a* Filter cleaning outlet opening of the filter cleaning pipe
12 Second purge pipe
12*a* Second outlet opening of the second purge pipe
13 Filter
14*a* Exterior surface of the filter
14*b* Interior surface of the filter
15 Filter housing
16*a* Gas tank of a first gas supply system
16*b* Canon valve of a first gas supply system
18*a* Gas tank of a second gas supply system
18*b* Canon valve of the second gas supply system

19 Distributing means
19*a* Second outlet openings
20 Nozzle
21 Gas source for filter cleaning system
22 Extraction means
23 Gas analysis system
23 Displacement means

The invention claimed is:

1. A gas sampling apparatus for extraction of a gaseous sample from a gaseous environment comprising flue gas comprising solid particles, wherein the gas sampling apparatus comprises:

a housing comprising a housing wall enclosing an interior of the housing, wherein the housing wall comprises:

an exterior housing surface;

an interior housing surface;

a rim surface connecting the exterior housing surface and the interior housing surface and enclosing a housing opening directed towards a gaseous environment during use, wherein the housing opening is located at a front portion of the housing and is configured to provide initial fluid communication between the gaseous environment and the interior of the housing;

a sample system for extracting a gaseous sample from the gaseous environment, wherein the sample system comprises:

at least one sample pipe having an opening at the front portion of the housing, wherein at least the opening is enclosed by the housing wall and is configured to be in fluid communication with the gaseous environment; and filter means comprising at least one filter for filtering a plurality of solid particles from the gaseous sample, wherein the at least one filter is enclosed by the housing wall and arranged at the opening of the at least one sample pipe, wherein the gas sampling apparatus further comprises:

a central purge system configured to remove aggregates of solid particles deposited on one or more of the rim surface, the interior housing surface and the exterior housing surface by a gaseous medium, wherein the central purge system comprises at least one purge pipe comprising an outlet opening directed towards the housing opening and enclosed by the housing wall;

a peripheral purge system configured to clean at least a part of an exterior surface of the at least one filter, wherein the peripheral purge system comprises one or more second purge pipes enclosed by the housing and arranged externally to the sample system;

wherein the sample system is arranged externally to the central purge system so that at least the one sample pipe is separate from the at least one purge pipe, wherein the at least one filter is arranged radially between an exterior surface of the purge pipe and the housing; and wherein the at least one filter and the housing opening are positioned in an open end of the housing and wherein the open end of the housing is arranged to be positioned inside the gaseous environment, during use; further comprising a filter cleaning system for cleaning the at least one filter, wherein the filter cleaning system comprises one of more filter cleaning pipes configured to direct a gaseous medium through the at least one filter towards the gaseous environment; wherein the one or more second purge pipes are configured to be connected to a gas supply system and to transfer a gaseous medium from the gas supply system to at least a part of the exterior surface of the at least one filter; wherein the sample system is configured to be in connection with a gas analysis system so as to transfer the gaseous sample extracted from the gaseous environment to the gas analysis system.

2. The gas sampling apparatus according to claim 1, wherein the opening of the sample system is radially arranged between the central purge system and the housing wall.

3. The gas sampling apparatus according to claim 1, wherein the purge pipe is configured to transfer a gaseous medium from a gas supply system to at least a part of the interior of the housing arranged adjacent to the housing opening.

4. The gas sampling apparatus according to claim 1, wherein the outlet opening of the purge pipe has an inner outlet diameter, which is between 15-35 mm.

5. The gas sampling apparatus according to claim 1, wherein the outlet opening of the purge pipe has an inner diameter, which is between 1.5-5 times larger than an inner diameter of the opening of the at least one sample pipe.

6. The gas sampling apparatus according to claim 1, wherein the one or more filter cleaning pipes comprises a filter cleaning inlet opening configured to be connected with a gas source and a filter cleaning outlet opening arranged so as to face the at least one filter.

7. The gas sampling apparatus according to claim 1, wherein the at least one filter of the filter means is arranged between the opening of the at least one sample pipe and the gaseous environment present in the interior of the housing, when the gas sampling apparatus is in use.

8. The gas sampling apparatus according to claim 1, wherein the at least one filter is of a tubular shape and is arranged coaxially with the purge pipe.

9. The gas sampling apparatus according to claim 1, wherein the peripheral purge system comprises distribution means comprising one or more outlet openings, wherein the distribution means is arranged for distributing a gaseous medium from the gas supply system through the one or more outlet openings towards the housing opening.

10. The gas sampling apparatus according to claim 1, wherein the central purge system and/or the filter cleaning system and/or the peripheral purge system are arranged to be operated independently from the sample system.

11. The gas sampling apparatus according to claim 1, wherein the sample system is in connection with one or more extraction means, for extraction of a gas sample through the at least one sample pipe.

12. The gas sampling apparatus according to claim 1, comprising a gas analysis system arranged in connection with the sample system and arranged to analyze a gas sample extracted from the gaseous environment.

13. The gas sampling apparatus according to claim 1, wherein the sample system comprises heating means for heating at least an interior surface of the at least one sample pipe.

14. The gas sampling apparatus according to claim 1, wherein the housing comprises cooling means for cooling a least the exterior housing surface.

15. Use of a gas sampling apparatus comprising:
   a housing comprising a housing wall enclosing an interior of the housing, wherein the housing wall comprises:
      an exterior housing surface;
      an interior housing surface;
      a rim surface connecting the exterior housing surface and the interior housing surface enclosing a housing opening directed towards a gaseous environment during use, wherein the housing opening is located at a front portion of the housing and is configured to provide initial fluid communication between the gaseous environment and the interior of the housing;
   a sample system for extracting a gaseous sample from the gaseous environment, wherein the sample system comprises:
      at least one sample pipe having an opening at the front portion of the housing, wherein at least the opening is enclosed by the housing wall and is configured to be in fluid communication with the gaseous environment; and
      filter means comprising at least one filter for filtering a plurality of solid particles from the gaseous sample, wherein the at least one filter is enclosed by the housing wall and arranged at the opening of the at least one sample pipe, wherein the gas sampling apparatus further comprises:
   a central purge system configured to remove aggregates of solid particles deposited on one or more of the rim surface, the interior housing surface and the exterior housing surface by a gaseous medium, wherein the central purge system comprises at least one purge pipe comprising an outlet opening directed towards the housing opening and enclosed by the housing wall;
   a peripheral purge system configured to clean at least a part of an exterior surface of the at least one filter, wherein the peripheral purge system comprises one or more second purge pipes enclosed by the housing and arranged externally to the sample system;
   wherein the sample system is arranged externally to the central purge system so that at least the one sample pipe is separate from the at least one purge pipe; and
   wherein the at least one filter and the housing opening are positioned in an open end of the housing and wherein the open end of the housing is arranged to be positioned inside the gaseous environment, during use, wherein the use comprises:
   extracting a gas sample from a gaseous environment, wherein a gaseous sample is extracted from the gaseous environment through the housing opening and the first opening and thereafter through the sample pipe; and
   cleaning at least a part of housing by releasing a gaseous medium towards one or more of the rim surface, the interior housing surface and the exterior housing surface through at least the purge pipe, and wherein the at least one filter is arranged radially between an exterior surface of the purge pipe and the housing further comprising a filter cleaning system for cleaning the at least one filter, wherein the filter cleaning system comprises one of more filter cleaning pipes configured to direct a gaseous medium through the at least one filter towards the gaseous environment; wherein the one or more second purge pipes are configured to be connected to a gas supply system and to transfer a gaseous medium from the gas supply system to at least a part of the exterior surface of the at least one filter; wherein the sample system is configured to be in connection with a gas analysis system so as to transfer the gaseous sample extracted from the gaseous environment to the gas analysis system.

16. A gas sampling apparatus for extraction of a gaseous sample from a gaseous environment comprising flue gas comprising solid particles, wherein the gas sampling apparatus comprises:

a housing comprising a housing wall enclosing an interior of the housing, wherein the housing wall comprises:

an exterior housing surface;

an interior housing surface;

a rim surface connecting the exterior housing surface and the interior housing surface and enclosing a housing opening directed towards a gaseous environment during use, the housing opening is located a front portion of the housing and is positioned in an open end of the housing, wherein the open end of the housing is arranged to be positioned inside the gaseous environment, during use, wherein the housing opening is configured to provide initial fluid communication between the gaseous environment and the interior of the housing;

a sample system for extracting a gaseous sample from the gaseous environment, wherein the sample system comprises:

at least one sample pipe having a opening at the front portion of the housing, wherein the opening is enclosed by the housing wall and is configured to be in fluid communication with the gaseous environment; and filter means comprising at least one filter for filtering a plurality of solid particles from the gaseous sample, wherein the at least one filter is enclosed by the housing wall and arranged at the opening of the at least one sample pipe and in the open end of the housing, wherein the gas sampling apparatus further comprises:

a central purge system configured to remove aggregates of solid particles deposited on one or more of the rim surface, the interior housing surface and the exterior housing surface by means of a gaseous medium, wherein the central purge system comprises at least one purge pipe comprising an outlet opening directed towards the housing opening and enclosed by the housing wall;

a peripheral purge system configured to clean at least a part of an exterior surface of the at least one filter, wherein the peripheral purge system comprises one or more second purge pipes enclosed by the housing and arranged externally to the sample system; and wherein the sample system is arranged externally to the central purge system so that at least the at least one sample pipe is separate from the at least one purge pipe and wherein the at least one filter is arranged radially between the housing and an exterior surface of the at least one purge pipe; further comprising a filter cleaning system for cleaning the at least one filter, wherein the filter cleaning system comprises one of more filter cleaning pipes configured to direct a gaseous medium through the at least one filter towards the gaseous environment; wherein the one or more second purge pipes are configured to be connected to a gas supply system and to transfer a gaseous medium from the gas supply system to at least a part of the exterior surface of the at least one filter; wherein the sample system is configured to be in connection with a gas analysis system so as to transfer the gaseous sample extracted from the gaseous environment to the gas analysis system.

* * * * *